April 24, 1928.
C. FRANKLIN ET AL
1,667,032
MILK BOTTLE SUPPORT
Filed Aug. 17, 1926
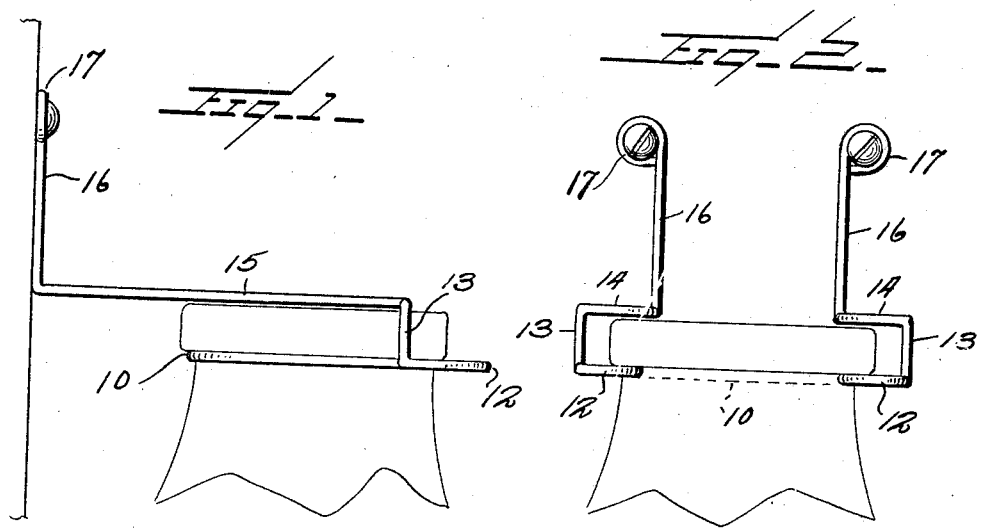
Inventors
Chester Franklin
Christine Franklin
By Watson E. Coleman
Attorney Patented Apr. 24, 1928.

1,667,032

UNITED STATES PATENT OFFICE.

CHESTER FRANKLIN AND CHRISTINE FRANKLIN, OF WILLARD, OHIO.

MILK-BOTTLE SUPPORT.

Application filed August 17, 1926. Serial No. 129,850.

This invention relates to devices for supporting milk bottles in such position that animals cannot have access to them and the general object of the invention is to provide a milk bottle holder of a very simple and yet effective structure which may be readily applied to the wall or other support and which is so formed as to grab the enlarged mouth of the bottle and support the bottle against accidental removal.

Our invention is illustrated in the accompanying drawings wherein:—

Figure 1 is a side elevation of our improved milk bottle support;

Fig. 2 is a front elevation thereof;

Fig. 3 is a perspective view thereof.

Referring to these drawings it will be seen that our milk bottle support is formed of a single length of wire. This wire is bent at its middle to form a somewhat semi-elliptical loop 10 having a more or less constricted mouth 11, the wire at each end of the U-shaped or somewhat semi-elliptical portion 10 being laterally bent outward as at 12 and rearwardly bent upward as at 13, then inward as at 14, so as to extend inward slightly beyond the loop 10 and then rearward at 15 and upward at 16, these upwardly extending portions being provided with eyes 17.

In the use of this device the screws or nails are passed through the eyes 17 to support the holder upon a wall, piazza post, or other element. The milk bottle is capable of being inserted with the flaring mouth of the milk bottle disposed within the loop 10, the flaring mouth extending laterally over this loop while the longitudinal portions 15 extend over the mouth. Thus, the milk bottle is held from detachment or accidental lifting out and it cannot drop down. Inasmuch as the throat 11 is contracted, the milk bottle will be held from accidental detachment.

We claim:—

A milk bottle holder comprising a U-shaped neck embracing portion contracted at its throat, and made of wire, the holder extending laterally from the ends of the U-shaped portion in opposite directions, then extending rearward, then extending upward at right angles to the U-shaped portion and then extending inward beyond the legs of the U-shaped portion, then extending longitudinally rearward beyond the bight end of the U-shaped portion, then extending upwardly and formed with attachment eyes, the inwardly extending portions being disposed in a plane above the U-shaped portion to thus provide means engageable over the top of a milk bottle to prevent upward movement of the milk bottle.

In testimony whereof we hereunto affix our signatures.

CHESTER FRANKLIN.
CHRISTINE FRANKLIN.